United States Patent
Pawlow et al.

(10) Patent No.: US 8,541,527 B2
(45) Date of Patent: *Sep. 24, 2013

(54) ELASTOMERS, PROCESS FOR PREPARATION, AND USES THEREOF

(75) Inventors: James Pawlow, Akron, OH (US); Christopher Robertson, Akron, OH (US); Daniel Graves, Canal Fulton, OH (US); Mitch Barry, North Canton, OH (US)

(73) Assignee: Firestone Polymers, LLC, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/489,520

(22) Filed: Jun. 6, 2012

(65) Prior Publication Data

US 2012/0245271 A1 Sep. 27, 2012

Related U.S. Application Data

(63) Continuation of application No. 12/466,128, filed as application No. PCT/US2007/021976 on Oct. 15, 2007, now Pat. No. 8,210,967.

(60) Provisional application No. 60/852,219, filed on Oct. 17, 2006.

(51) Int. Cl.
  *C08G 61/08* (2006.01)
  *A63B 37/06* (2006.01)
  *C08F 4/80* (2006.01)

(52) U.S. Cl.
  USPC ........ 526/308; 526/171; 525/332.1; 525/370; 525/386; 525/919; 524/554; 473/351

(58) Field of Classification Search
  USPC ......... 526/281, 282, 308, 309, 171; 473/351; 525/332.1, 370, 386, 919; 524/554
  See application file for complete search history.

(56) References Cited

U.S. PATENT DOCUMENTS 3,778,420 A * 12/1973 Brown et al. ................. 526/283
3,917,747 A * 11/1975 Matsumura et al. .......... 525/249
4,239,874 A * 12/1980 Ofstead et al. ............... 526/143
8,210,967 B2 * 7/2012 Pawlow et al. ............... 473/351

FOREIGN PATENT DOCUMENTS

JP 2003-335845 * 11/2003

OTHER PUBLICATIONS

Machine translation of JP2003-335845; publication date: Nov. 2003.*

* cited by examiner

*Primary Examiner* — Fred M Teskin
(74) *Attorney, Agent, or Firm* — Meredith E. Hooker; Arthur M. Reginelli

(57) ABSTRACT

Elastomeric interpolymers comprising at least two, or more, cyclic olefin monomers that are prepared by ring opening metathesis polymerization, and that are characterized by having no crystallinity, a glass transition temperature ($T_g$) of less than −80° C., and a number average molecular weight ($M_n$) of at least 40 kg/mole, and functionalized products thereof.

A ring opening metathesis polymerization process for producing the elastomeric interpolymers having no crystallinity. Uses of the elastomeric interpolymers in applications such as rubber compounds, tires, and the like.

Cores of golf balls that are prepared by using metathesis polymerization produced elastomeric interpolymers having 0 to about 30% crystallinity.

21 Claims, No Drawings

ELASTOMERS, PROCESS FOR PREPARATION, AND USES THEREOF

This application is a continuation application of U.S. Pat. No. 8,210,967, filed Jun. 24, 2009, which is 371 application of International Application Serial No. PCT/US2007/021976, filed on Oct. 15, 2007, which claims the benefit of Provisional U.S. Patent Application Ser. No. 60/852,219, filed Oct. 17, 2006, which are incorporated herein by reference.

FIELD OF THE DISCLOSURE

The present disclosure relates to elastomers, a process for preparation of the elastomers, and uses of the elastomers, particularly in the production of cores of golf balls and in rubber formulations.

BACKGROUND OF THE DISCLOSURE

Golf ball cores are generally made using an elastomeric polybutadiene that may be crosslinked. Typically the polybutadiene is a nonfunctional polymer and will have little interaction with other compounds that make up the core of the golf ball. A conventional polymer for use as the core of a golf ball is a medium or high cis 1,4-polybutadiene containing branching and/or 1,2 vinyl groups. In many cases the polybutadiene is prepared by anionic or transition metal (Ziegler-Natta) type polymerization systems.

In other instances the polybutadiene is crosslinked with natural rubber or other elastomers. Other types of elastomers may include neoprene, polyisoprene, and ethylene-propylene diene monomer and combinations thereof. As for the crosslinking agents, zinc diacrylate and peroxide are crosslinking agents for golf ball applications. Finally, other compounds such as fillers or processing aids may be compounded into the rubber formulation to form the core of the golf ball.

There is a continuing need for elastomers that are expected to be equal, and perhaps more effective in the production of golf ball cores.

SUMMARY OF THE DISCLOSURE

The present disclosure, in a first embodiment, relates to novel elastomeric interpolymers comprised of at least two different cyclic olefin monomers, which interpolymers are prepared by ring opening metathesis polymerization process (ROMP), and which interpolymers are characterized as being non-crystalline as measured by the DSC technique described herein, have a glass transition temperature ($T_g$) of less than about −80° C., and have a number average molecular weight ($M_n$) of at least 40 kg/mole.

In another embodiment, the present disclosure relates to a novel method for preparing the present non-crystalline cyclic olefin interpolymers that comprises using a ring opening metathesis polymerization (ROMP) process, that includes a ring opening metathesis catalyst, and a polymerization terminator.

In another embodiment, the novel cyclic olefin interpolymers, which are interpolymers of at least two cyclic olefins, comprise at least one functional group.

In another embodiment, the present disclosure relates to uses of the novel interpolymers in the production of rubber compounds, tires, golf balls, cores of golf balls, and the like.

In another embodiment, the present disclosure relates to novel rubber compounds and novel golf balls and cores of golf balls that utilize elastomeric interpolymers comprised of at least two different cyclic olefin monomers, which interpolymers are prepared by ring opening metathesis polymerization process (ROMP), and which interpolymers are characterized as having an amount of crystallinity ranging from 0 to about 30% in one embodiment, and in other embodiments, from 0 to 25%, from 0 to about 20%, from 0 to about 10%, from 0 to about 5%, from 0 to about 2%, and 0%, as measured by DSC technique described herein, have a glass transition temperature ($T_g$) of less than about −80° C., and have a number average molecular weight ($M_n$) of at least 40 kg/mole. These interpolymers may be prepared by using a ring opening metathesis polymerization (ROMP) process, that includes a ring opening metathesis catalyst, and a polymerization terminator.

DETAILED DESCRIPTION OF THE DISCLOSURE

The present disclosure, in a first embodiment, relates to novel elastomeric interpolymers comprised of at least two different cyclic olefin monomers, which interpolymers are prepared by ring opening metathesis polymerization (ROMP) process, and which interpolymers are characterized as being non-crystalline as measured by the DSC technique described herein, have a glass transition temperature ($T_g$) of less than about −80° C., and have a number average molecular weight ($M_n$) of at least 40 kg/mole.

In another embodiment, the present disclosure relates to a novel method for preparing the non-crystalline cyclic olefin interpolymers that comprises using a ring opening metathesis polymerization (ROMP) process, that includes a ring opening metathesis catalyst, and a polymerization terminator. The novel method for preparing the non-crystalline cyclic olefin interpolymers requires that at least one of the cyclic olefin monomers be present in an amount of about 15 to about 85 mole %, and the remaining amount of about 85 to about 15 mole % comprise the other cyclic olefin monomer(s).

In another embodiment, the novel non-crystalline cyclic olefin interpolymers, which are interpolymers of at least two cyclic olefins, comprise at least one functional group.

In another embodiment, the present disclosure relates to uses of the novel interpolymers in the production of rubber compounds, tires, golf balls, cores of golf balls, and the like.

In another embodiment, the present disclosure relates to novel rubber compounds and novel golf balls and cores of golf balls that utilize elastomeric interpolymers comprised of at least two different cyclic olefin monomers, which interpolymers are prepared by ring opening metathesis polymerization process (ROMP), and which interpolymers are characterized as having an amount of crystallinity ranging from 0 to about 30% in one embodiment, and in other embodiments, from 0 to 25%, from 0 to about 20%, from 0 to about 10%, from 0 to about 5%, from 0 to about 2%, and 0%, as measured by DSC technique described herein, have a glass transition temperature ($T_g$) of less than about −80° C., and have a number average molecular weight ($M_n$) of at least 40 kg/mole. These interpolymers may be prepared by using a ring opening metathesis polymerization (ROMP) process, that includes a ring opening metathesis catalyst, and a polymerization terminator.

In more detail, the novel elastomeric interpolymers of the present disclosure comprise interpolymers of at least two, or more, different cyclic olefin monomers. The two or more different cyclic olefin monomers are interpolymerized by ring opening metathesis polymerization. The novel resultant interpolymers of the ring opening metathesis polymerization (ROMP) are characterized by having no crystallinity (non crystalline), having a glass transition temperature ($T_g$) of less than about −80° C., and a number average molecular weight ($M_n$) of at least about 40 kg/mole. In another embodiment, the glass transition temperature ($T_g$) may range from about −80° C. to about −130° C., and in yet another embodiment, from about −90° C. to about −120° C. In another embodiment, the number average molecular weight ($M_n$) may vary from at least about 40 kg/mole to about 500 kg/mole, in another embodiment from about 60 kg/mole to about 200 kg/mole, in another embodiment from about 60 kg/mole to about 150 kg/mole, and in yet another embodiment, from about 40 kg/mole to about 100 kg/mole. The determination of the non-crystalline property of the interpolymers herein is achieved by differential scanning calorimetry (DSC).

In preparing the interpolymers, any two or more, different cyclic olefin monomers that may undergo ring opening metathesis polymerization may be used. Types of cyclic olefins which may be used include, but are not limited to, cyclic alkenes; cyclic dienes, cyclic trienes, cyclic polyenes, and combinations thereof. Specific examples of monomers that may be used, include but are not limited to, cyclopropene, cyclobutene, benzocyclobutene, cyclopentene, dicyclopentadiene, norbornene, norbornadiene, cycloheptene, cyclooctene, 7-oxanorbornene, 7-oxanorbornadiene, cyclodecene, 1,3-cyclooctadiene, 1,5-cyclooctadiene, 1,3-cycloheptadiene, [2.2.1]bicycloheptenes, [2.2.2]bicyclooctenes, cyclohexenylnorbornenes, norbornene dicarboxylic anhydrides, cyclododecene, 1,5,9-cyclododecatriene, derivatives thereof, and the like, and combinations thereof.

In another embodiment, the novel interpolymers herein having no crystallinity, may comprise at least one or more functional groups. In another embodiment, the interpolymer comprises at least two functional groups. In another embodiment, the at least one functional group may be located at a terminal end of the interpolymer. In another embodiment, the functional group may be a pendant group. Where the interpolymer is multifunctional, the functional groups may be located in any combination of the terminal end(s) and/or pendant group(s) of the interpolymer. In another embodiment, the functional group may be an ionic group, and in a further embodiment, a functional group that is capable of forming ionic bonds with a metal oxide, preferably a metal oxide used as filler in a golf ball core rubber formulation. An example of such a functional group is a carboxylic acid group. Examples of other suitable functional groups include amides, amines, esters, sulfonates, succinic anhydride, hydroxy groups, nitriles, and metal salts of carboxylic acids. In the case of a multifunctional interpolymer, the aforementioned functional groups may be present in any combination thereof. Hydroxy groups are used herein to describe an —OH grouping as well as a grouping in which the H atom has been replaced by one or more atoms.

In an embodiment, the novel interpolymers herein having no crystallinity have a number average molecular weight ($M_n$) of at least about 40 kg/mole. In another embodiment, the average molecular weight ($M_n$) of the interpolymers ranges from about 40 kg/mole to about 500 kg/mole, in another embodiment, from about 60 kg/mole to about 200 kg/mole, in another embodiment, from about 60 kg/mole to about 150 kg/mole, and in another embodiment, from about 40 kg/mole to about 100 kg/mole. In another embodiment, the $M_n$ is at least about 49 kg/mole; in another embodiment, at least about 75 kg/mole; in another embodiment, at least about 100 kg/mole; and in another embodiment, at least about 110 kg/mole. The $M_n$ is determined using standard GPC techniques using universal calibration with the appropriate Mark-Houwink constants. The GPC procedure is described in detail herein.

The relative amounts of the two or more cyclic olefin monomers comprising the novel interpolymers may be varied. Any amounts may be used provided that the resulting interpolymer is non-crystalline. The amounts will be a function of the end purpose for which the interpolymer is to be used. For example, in a particular embodiment a copolymer, comprises a ratio of monomer units ranging from about 3.0:1.0 to about 1.0:3.0, and in another embodiment, from about 2.0:1.0 to about 1.0:2.0, and in yet another embodiment, from about 1.5:1.0 to about 1.0:1.5, and further from about 1.0:1.0.

In another embodiment of the present disclosure, there is provided a process for producing the interpolymers herein having no crystallinity comprising at least two or more cyclic olefin monomers. The method comprises ring opening metathesis polymerization of at least two, or more, cyclic olefin monomers in the presence of a ring opening metathesis polymerization catalyst, and terminating the ring opening metathesis polymerization (ROMP). Any cyclic olefin monomer that can participate in a ROMP reaction may be used. Examples of suitable cyclic olefin monomers have been described herein. The novel method for preparing the non-crystalline cyclic olefin interpolymers requires that at least one of the cyclic olefin monomers be present in an amount of about 15 to about 85 mole %, and the remaining amount of about 85 to about 15 mole % comprise the other cyclic olefin monomer(s).

In a typical ROMP, cyclic olefin monomers capable of undergoing ring opening metathesis polymerization were mixed in a reaction vessel and contacted with a ROMP metathesis catalyst while stirring at a temperature range at which the ROMP metathesis reaction occurs. The reaction is optionally performed in the presence of a solvent. If a solvent is utilized, the concentration of the monomers is above the equilibrium monomer concentration. The reaction is continued until the desired level of monomer conversion and molecular weight range is achieved or until the monomer concentration is below the equilibrium monomer concentration. At this point, catalyst deactivation is induced and the reaction is terminated. The polymer produced is then removed from the reaction vessel.

In respect of the ROMP process herein, the equilibrium monomer concentration is the monomer concentration below which no further polymerization occurs at a given temperature. Furthermore, the deactivation of the catalyst may be induced by use of a catalyst deactivator, which is a moiety that terminates the activity of a catalytic species when placed in contact with the catalytic species. For further information, ROMP is described in K. J. Ivin and J. C. Mol, *Olefin Metathesis and Metathesis Polymerization*, Chap. 11 (1997), which is hereby incorporated by reference.

Any ring opening metathesis polymerization catalyst may be used to initiate the ring opening metathesis polymerization. Suitable types of ROMP metathesis catalysts include an in-situ catalyst, a supported metathesis catalyst, and a single-site catalyst. An example of an in-situ catalyst is the reaction product of a transition metal halide and an alkyl compound that includes an IUPAC Group IIIB element, e.g., B, Al, Ga, In, and Tl. For more background on in-situ catalysts, incorporated herein by reference is K. J. Ivin and J. C. Mol, *Olefin Metathesis and Metathesis Polymerization*, Chap. 2 (1997).

In respect of the ROMP process, supported metathesis catalysts suitable for ring opening metathesis polymerization are well known. In detail, a supported ROMP metathesis catalyst is any type of ROMP catalyst that is chemically bound to or physically impregnated in a support material substrate and is capable of initiating a metathesis reaction. Examples of support materials include porous materials such as talc, inorganic oxides, inorganic chlorides, and resinous materials such as polyolefin or polymeric compounds. For further information on supported ROMP metathesis catalysts, reference is made to K. J. Irvin, J. C. Mol *Olefin Metathesis and Metathesis Polymerization* (Chapter 2) and R. H. Grubbs (ed) *Handbook of Metathesis* Vol. 2, Chap. 2.10, which are incorporated herein by reference in their entirety. Examples of supported metathesis catalysts include crosslinked polystyrene bound ruthenium metal carbenes and thermally activated molybdenum oxide impregnated in alumina.

With further respect to the ROMP process, there may be used as a catalyst, any single-site catalyst that is suitable for the ring opening metathesis polymerization of the cyclic olefin monomers to be achieved. In detail, a single-site catalyst may be described as a catalyst solely composed of one molecular species which contains a well-defined single catalytic site. The single-site catalysts for the ROMP process are well-known.

Examples of single-site ROMP process catalysts are referred to as Grubbs-type catalysts and Schrock-type catalysts. The Grubbs-type and the Schrock-type catalysts are well-known catalysts.

In more detail, Grubbs-type catalysts are single-site transition metal complex catalysts that are capable of initiating a ROMP metathesis reaction. Key structural features of Grubbs catalysts are the presence of an active carbene metal-carbon double bond and an electron-rich, low oxidation state transition metal center atom such as ruthenium or osmium.

Schrock-type catalysts are a class of single-site transition metal complexes capable of initiating a metathesis reaction. Key structural features of Schrock catalysts are the presence of an active alkylidene metal-carbon double bond and an electron-deficient, high oxidation state early transition metal center atom such as tungsten or molybdenum.

For more information on Schrock-type catalysts, reference is made to R. R. Schrock *Agnew. Chem. Int. Ed*. (2006), 45, 3748. "Multiple Metal-Carbon Bonds for Catalytic Metathesis Reactions," the content of which is hereby incorporated by reference.

For more information on Grubbs-type catalysts, reference is made to R. H. Grubbs *Agnew. Chem. Int. Ed*. (2006) 45, 3760. "Olefin-metathesis Catalysts for the Preparation of Molecules and Materials," the contents of which are incorporated herein by reference.

In one or more embodiments, the ROMP catalyst includes a ruthenium-based or osmium-based ROMP catalyst. Any ruthenium-based or osmium-based ROMP catalyst that is effective for ring-opening metathesis polymerization (ROMP) reactions can be used.

The ROMP method may include isolating the interpolymer. Exemplary techniques, which may be used to isolate the interpolymer, include steam desolventizing the interpolymer, drum drying, or coagulating the interpolymer in a suitable non-solvent material such as isopropanol, or distillation of solvent or unreacted monomer.

The ROMP method may also be used to produce interpolymers containing one or more functional groups on the chain terminus, on the polymer backbone, or as a pendant group. In one embodiment, the functionalized interpolymer is formed from the ring opening metathesis polymerization of a mixture of cyclic olefin monomers wherein at least one monomer contains an integral functional group. In another embodiment, the functionalized interpolymer is formed from the ring opening metathesis polymerization of a mixture of cyclic olefin monomers and an additive alkene containing a functional group. It is also possible to add at least one functional group to the polymer chain along the backbone or at the chain end after the ROMP reaction is complete. In one embodiment, maleic anhydride is added to the polymer chain, producing a succinic anhydride group.

In carrying out the ROMP process for producing the interpolymers, it is possible to introduce additives to control the molecular weight and/or place functionality on the ends of the interpolymer chains. In one embodiment, the additive is trans-β-hydromuconic acid or the like.

Examples of solvents that can be used in the ROMP include, but are not limited to, organic solvents that are inert under the ROMP conditions. Suitable solvents include aromatic hydrocarbons, chlorinated hydrocarbons, ethers, aliphatic hydrocarbons, alcohols, ketones, or mixtures thereof. Examples of useful solvents include benzene, toluene, p-xylene, methylene chloride, dichloroethane, dichlorobenzene, tetrahydrofuran, chloroform, n-hexane, cyclohexane, hexane isomers, heptane, diethyl ether, pentane, or mixtures thereof. In one embodiment, the solvent may be purified by degassing with an inert atmosphere. If desired, the solvent may be dried.

ROMP reactions occur over a wide range of temperatures. In one embodiment, the ROMP reaction may be carried out at a temperature ranging from about minus 50° C. to the ceiling temperature of the cyclic olefin monomer mixture. In another embodiment, the temperature ranges from minus 40° C. to about 120° C.

ROMP reactions typically occur at temperatures that are at or below the ceiling temperature of the olefin monomer having the lowest ceiling temperature. The ceiling temperature is the temperature above which a specific polymer cannot exist. At the ceiling temperature, the rate of depolymerization is the same as the rate of polymerization.

Any amount of catalyst may be used that allows the ROMP to be achieved, and the interpolymer to be prepared. In one embodiment, the amount of catalyst used is about 0.0001 mole catalyst to about 10 moles of catalyst per 100 moles of monomer.

The order in which the reactants are combined in the ROMP is not limited. In one embodiment, the olefin monomers are combined to form a mixture, and then the ROMP catalyst is added to the mixture.

The progress of the ROMP reaction can be monitored by standard techniques, e.g. gas chromatography, liquid chromatography, HPLC, nuclear magnetic resonance spectroscopy and % total solids analysis. In one embodiment, the reaction is terminated by adding a catalyst deactivator, that reacts with the ROMP catalyst, such as ethyl vinyl ether.

The ROMP process for preparing the interpolymers may be carried out continuously, semi-continuously or batchwise.

All of the above description concerning the ROMP process, except for use of the specified amounts of the cyclic olefin monomers described herein that result in the preparation of non-crystalline elastomeric interpolymers, is applicable to the preparation of metathesis elastomeric interpolymers that have a crystallinity level ranging from greater than 0% to about 30%.

In preparing rubber compositions herein, incorporating any of the cyclic olefin interpolymers having crystallinity ranging from 0 to about 30%, any rubber may be used. Suitable rubbers include, but are not limited to, any natural rubbers, synthetic rubbers and mixtures thereof. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more alpha-olefins and optionally one or more diene monomers.

Useful rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. In one embodiment, elastomers include natural rubber, isoprene, styrene-butadiene copolymers, and butadiene rubber, and mixtures thereof, as a result of their common usage in the tire industry.

The rubber compositions and golf ball core compositions herein may be prepared in accordance with any process known in the art. For example, the rubber compositions may be compounded or blended using mixing equipment and procedures conventionally employed in the art, such as kneaders, roll mills, and extruders.

The rubber compositions may comprise further ingredients that are known and conventional in the rubber compositions, such as fillers and additive materials such as, but not limited to, curing agents (for a general disclosure of suitable vulcanizing agents one can refer to Kirk-Othmer, *Encyclopedia of Chemical Technology*, 3$^{rd}$ ed., Wiley Interscience, N.Y. 1982, Vol. 20, pp. 365-468, particularly "*Vulcanization Agents and Auxiliary Materials*" pp. 390-402), activators, retarders and accelerators; processing additives, such as oils; resins, including tackifying resins; plasticizers; pigments; additional fillers, fatty acids; zinc oxide; waxes; antioxidants; antiozonants; peptizing agents; and the like. As known to those skilled in the art, the additives mentioned above are selected and commonly used in conventional amounts. For example, without limitation, a tire component compound typically contains elastomers, fillers, processing oils/aids, antidegradants, zinc oxide, stearic aid, sulfur, accelerators and coupling agents. Such compounds can have such additional ingredients in the following amounts:

Fillers: from about 0 to about 150 phr, and in another embodiment, from about 30 to about 80 phr;

Processing oils/aids: from about 0 to about 75 phr, and in another embodiment, from about 0 to about 40 phr;

Antidegradants: from about 0 to about 10 phr, and in another embodiment, from about 0 to about 5 phr;

Stearic acid: from about 0 to about 5 phr, and in another embodiment, from about 0 to about 3 phr;

Zinc oxide: from about 0 to about 10 phr, and in another embodiment, from about 0 to about 30 phr;

Sulfur: from about 0 to about 10 phr, and in another embodiment, from about 0 to about 5 phr; and Coupling agent: from about 0 to about 30 phr, and in another embodiment, from about 5 to about 15 phr.

Fillers that may be used include carbon black, fumed silica, colloidal silica, silica, alumina, aluminum hydroxide, magnesium hydroxide, clays (hydrated aluminum silicates) and starch.

Processing aids commonly include a broad category of substances that improve various aspects of the process of forming vulcanizable compositions and vulcanizates. For example, processing aids may prevent filler agglomeration and reduce viscosity.

Certain additional fillers can be utilized as processing aids, including clay (hydrous aluminum silicate), talc (hydrous magnesium silicate), aluminum hydrate, mica, and sodium sulfate. In one embodiment, micas principally containing alumina and silica are used.

Rubber curing agents may be employed, including sulfur or peroxide-based curing systems. Curing agents are described in *Kirk-Othmer, Encyclopedia of Chemical Technology*, Vol. 20, pp. 365-468, (3$^{rd}$ Ed. 1982), particularly *Vulcanization Agents and Auxiliary Materials*, 390-402, and A. Y. Coran, *Vulcanization in Encyclopedia of Polymer Science and Engineering* (2$^{nd}$ Ed. 1989), which are incorporated herein by reference. Vulcanizing agents may be used alone or in combination.

Accelerators that may be used suitably include thiazoles, dithiocarbamates, dithiophosphates, guanidines, sulfenamides, sulfenimides, and thiurams. Specific examples include 2-mercaptobenzothiazole, 2,2'-dithiobis(benzothiazole), N-cyclohexyl-2-benzothiazole-sulfenamide (CBS), N-tert-butyl-2-benzothiazole sulfenamide (TBBS), and 1,3-diphenylguanidine.

Oils, waxes, scorch inhibiting agents, tackifying resins, reinforcing resins, fatty acids, peptizers, and zinc oxide may also be employed.

In preparing the rubber compositions, in one embodiment, an initial masterbatch is prepared that includes the rubber component and the reinforcing fillers, as well as other optional non-curative additives, such as processing oil, antioxidants, and the like. After the masterbatch is prepared, one or more optional remill stages can follow in which either no ingredients are added to the first mixture, or the remainder of the non-curing ingredients are added, in one embodiment, to reduce the compound viscosity and improve the dispersion of the reinforcing filler. The final step of the mixing process is the addition of vulcanizing agents to the mixture.

In more detail concerning the masterbatch process, the vulcanizable rubber composition may be prepared by forming an initial masterbatch composition that includes elastomer and other ingredients. To prevent premature vulcanization, this initial composition generally excludes any vulcanizing agents.

Once the initial masterbatch composition is processed, the vulcanizing agents may be introduced and blended into the initial masterbatch to form a final mix. Additional ingredients, such as accelerators, may be added to the final mix during this stage. The final mix in one embodiment, is prepared at low temperatures that do not initiate the vulcanization process.

In respect of golf ball formulations and systems, the following is appropriate. The typical cure systems used in golf ball cores consist of a free radical initiator such as organic peroxides, a metal salt crosslinking agent and a co-curing agent such as unsaturated organic imides or multifunctional monomers such as triallyl cyanurate. Examples of the metal salt crosslinking agents include zinc and magnesium diacrylates and dimethacrylates. Co-curing agents such as triallyl cyanurate, triallyl isocyanurate and N,N-m-phenylene dimaleimide are available for use. Peroxide initiators, such as dicumyl peroxide are available for use.

In preparing cores of golf balls and golf balls, the elastomeric interpolymers described herein that are prepared by ROMP may be utilized.

Suitable for use in preparing cores for golf balls and golf balls, are elastomeric interpolymers comprising at least two cyclic olefin monomers, wherein the interpolymer is prepared by a ring opening metathesis polymerization of the at least two cyclic olefin monomers, and wherein the interpolymer is characterized by having no crystallinity, a glass transition temperature ($T_g$) of less than −80° C. and a number average molecular weight ($M_n$) of at least 40 kg/mole, each of the properties determined by the test procedures described herein. With respect to these interpolymers, the $T_g$ may range from about −80° C. to about −130° C. in one embodiment, and in another embodiment, from about −90° C. to about −120° C. Further, the $M_n$ may vary from at least 40 kg/mole to about 500 kg/mole, in one embodiment, and in other embodiments, from about 60 to about 200 kg/mole, and from about 60 to about 150 kg/mole.

Also suitable for use in preparing cores for golf balls and golf balls are elastomeric interpolymers comprising at least two cyclic olefin monomers, wherein the interpolymer is prepared by a ring opening metathesis polymerization of the at least two cyclic olefin monomers, and wherein the interpolymer is characterized by having a crystallinity ranging from 0 to about 30% in one embodiment, and in other embodiments, from 0 to 25%, from 0 to about 20%, from 0 to about 10%, from 0 to about 5%, from 0 to about 2%, and 0%, a glass transition temperature ($T_g$) of less than −80° C., and a number average molecular weight ($M_n$) of at least 40 kg/mole, each of the properties determined by the test procedures described herein. With respect to these interpolymers, the $T_g$ may range from about −80° C. to about in one embodiment, and in another embodiment, from about −90° C. to about −120° C. Further, the $M_n$ may vary from at least 40 kg/mole to about 500 kg/mole, in one embodiment, and in other embodiments, from about 60 to about 200 kg/mole, and from about 60 to about 150 kg/mole. In addition, in one embodiment, the crystallinity may vary from greater than 0 to about 30% in one embodiment, and in other embodiments, from 0 to 25%, from 0 to about 20%, from 0 to about 10%, from 0 to about 5%, from 0 to about 2%, and 0%.

It is expected that the metathesis prepared interpolymers herein whether having or not having crystallinity, will have a suitable balance of dynamic stiffness and hysteresis. It is further expected that the present metathesis prepared interpolymers whether having or not having crystallinity, will have a satisfactory balance of coefficient of restitution and compression response properties such that a useful golf ball core and golf ball may be produced. The present interpolymers whether having crystallinity or not having crystallinity, are expected to also have applications in the areas of rubber for tires as well as plastics or other types of rubber compounds. Particular plastics of interest include ABS and HIPS.

The following examples are presented to illustrate the present disclosure and to assist one of ordinary skill in making and using the same. The examples are not intended in any way to otherwise limit the scope of the disclosure.

EXAMPLES

Test Procedures

Crystallinity and Glass Transition Temperature ($T_g$)

The degree of crystallinity of the interpolymers produced herein by the ROMP of the cyclic olefin monomers is determined as follows. The glass transition temperature ($T_g$) of the interpolymers produced herein by the ROMP of cyclic olefin monomers is determined as follows:

Thermal properties of the interpolymers were measured by conventional differential scanning calorimetry (DSC). Using a TA Instruments DSC 2910, a 10 mg sample of the interpolymer is cooled from room temperature to −150° C., at a cooling rate of 10° C./minute, and then heated to 100° C. at a rate of 10° C./minute. The heat flow data, collected during the heating scan, were used to assess thermal transitions of the interpolymer.

Polymers which have sufficient chain stereoregularity can crystallize at temperatures between the glass transition temperature and the melting temperature. Unlike low molecular weight organic liquids, however, complete crystallization is never possible and hence crystallizable polymers are considered semi-crystalline materials with typical levels of crystallinity ranging from 15% to 70% as determined using standard differential scanning calorimetry (DSC) techniques. As is commonly known, the percent crystallinity ($X_c$) can be evaluated by DSC from the area of the endothermic melting peak (A), which is integrated relative to the underlying heat flow baseline, by dividing this area by tabulated heat of fusion ($\Delta H_f$) for the polymer of interest. This is indicated in the equation below:

$$Xc = 100 * A/\Delta H_f$$

Both A and $\Delta H_f$ are in units of J/g and $X_c$ is expressed in %. For the polymers claimed herein, the reported heat of fusion for cis-1,4-polybutadiene is the most appropriate known value for percent crystallinity determination. This value is 170.4 J/g [L. Mandelkern and R. G. Alamo, "Thermodynamic Quantities Governing Melting", in J. E. Mark, ed., *Physical Properties of Polymers Handbook* (AIP Press: Woodbury, N.Y., 1996).

In determining the crystallinity level of the interpolymer, it is understood that an interpolymer is considered to be non-crystalline if the interpolymer does not display an endothermic melting transition at temperatures above the glass transition temperature ($T_g$) when using the above DSC technique. In other words, $X_c = 0$ for non-crystalline interpolymers. There is a step change in the heat flow versus temperature response at the glass transition. The glass transition temperature ($T_g$) is defined as the temperature corresponding to the midpoint in the endothermic step in heat flow in accordance with standard practice.

Number Average Molecular Weight ($M_n$)

The number average molecular weight ($M_n$) of the interpolymers produced herein by the ROMP of cyclic monomers is determined by the following procedure:

Gel permeation chromatography (GPC) was performed in tetrahydrofuran solvent using a Waters Model 150-C with a refractive index detector. GPC measurements were conducted relative to polystyrene standards, and the results were then converted into numerical molecular weight data by applying the universal calibration approach using data from the molecular weight dependence of intrinsic viscosity. The Mark-Houwink constants for cis-1,4-polybutadiene were used for the universal calibration. The number average molecular weight ($M_n$) and weight average molecular weight ($M_w$) were determined from the molecular weight distribution based on the well-known definitions of these averages.

Compression Test

PGA compression is determined by placing a golf ball in an apparatus which has the form of a small press with an upper and lower anvil. The upper anvil is at rest against a 200 pound (90.7 kg) spring die, and the lower anvil has a range of linear travel of about 0.300 inches (7.6 mm) by means of a crank mechanism. In its open position, the gap between the anvils is sufficient to allow a clearance of at least 0.100 (2.5 mm) inches after insertion of the test ball. As the lower anvil is raised by the crank and the gap is closed, the apparatus applies compressive force and presses the ball against the spring loaded upper anvil. When the equilibrium point of the spring is reached, the deflection of the upper anvil is measured with a micrometer. When testing a ball where deflection of the upper anvil is 0.200 inches, (5.1 mm) the ball will be regarded as having a PGA compression of "0." In practice, tournament quality balls have compression ratings about 50 to 100 which means that the upper anvil was deflected a total of 0.150 inches (3.8 mm) to 0.100 inches (2.5 mm). The compression device is manufactured by O K Automation of Sinking Spring, Pa.

Coefficient of Restitution (COR):

The coefficient of restitution is the ratio of the inbound velocity vs. outbound velocity of a golf ball (or core) measured by firing the core from an air cannon at speeds from 100 to 144 ft. per second (30.5 to 45.7 meters/second). The ball rebounds from a thick solid steel plate and the two velocities are measured electronically. The machine is produced by Hye Precision Products, Perry, Ga.

Example 1

A batch mixture comprised of 1.3 kg (1.6 L) olefin free cyclohexane, 0.75 kg (0.97 L, 11.0 moles) cyclopentene, and 0.51 kg (0.57 L, 3.1 moles) 1,5,9-cyclododecatriene were charged into a 1-gallon volume reactor, purged with nitrogen, and stirred (49.5% solids). A solution of 0.90 g of trans-β-hydromuconic acid (6.2 mmol) in 100 mL absolute ethanol was charged into the vessel and the reactor contents were heated to 40° C. A solution composed of 0.21 g (0.25 mmol) Grubbs 2nd Generation ruthenium ring opening metathesis polymerization catalyst in 50 mL of degassed toluene was added to the reactor. Within 20 minutes, polymerization of the monomers began to occur, and a reaction temperature increase to 43° C. was observed. The resulting product was then stirred at a constant 40° C. temperature for an additional 2 hours. At this time, 4 mL of ethyl vinyl ether was added to terminate the polymerization. After stirring an additional 12 hours, the interpolymer solution was then coagulated into an isopropanol/BHT (butylated hydroxy toluene) mixture, producing a white, elastomeric solid material. The resulting elastomeric interpolymer had the following characteristics: non crystalline; $M_n$=49.2 kg/mol; $M_w/M_n$=1.6; $T_g$=−97.7° C. The interpolymer composition was 45:55 mole percent butenyl:pentenyl units. The catalyst utilized in this example is referred to commercially as "Grubbs Second Generation Catalyst." This catalyst is manufactured by Materia, Inc. (Pasadena, Calif. USA) and the catalyst is sold by Sigma-Aldrich (St. Louis, Mo. USA). The chemical name of the catalyst is (1,3-Bis(2,4,6-trimethylphenyl)-2-imidazolidinylidene) dichloro (phenylmethylene) (tricyclohexylphosphine) ruthenium.

Example 2

A batch mixture comprised of 1.1 kg (1.4 L) deolefinated cyclohexane, 0.73 kg (0.95 L, 10.9 moles) cyclopentene, and 0.51 kg (0.57, 3.1 moles) L 1,5,9-cyclododecatriene were charged into a 1-gallon volume reactor, purged with nitrogen, and stirred (52.6% solids). A solution of 0.90 g of trans-β-hydromuconic acid (6.2 mmol) in 100 mL absolute ethanol was charged into the vessel and the reactor contents were heated to 55° C. A solution composed of 0.49 g (0.6 mmol) Grubbs $2^{nd}$ Generation ruthenium metathesis catalyst in 50 mL degassed toluene was added to the reactor. Within 10 minutes, polymerization of the monomer began to occur, and a reaction temperature increase to 71° C. was observed. The resulting polymer solution was then cooled to 40° C. and stirred for an additional 2 hours. At this time, a solution of 5 mL of ethyl vinyl ether in 50 mL cyclohexene was added to terminate the polymerization. After stirring an additional 12 hours, the polymer was then isolated by coagulation into an isopropanol/BHT (butylated hydroxy toluene) mixture, producing elastomeric solid material. The resulting polymer had the following characteristics: $M_n$=58.5 kg/mol; $M_w/M_n$=1.67; $T_g$=−95.6° C., and was non-crystalline. The interpolymer composition was 53:47 percent butenyl:pentenyl units. The catalyst utilized in this example is referred to commercially as "Grubbs Second Generation Catalyst." This catalyst is manufactured by Materia, Inc. (Pasadena, Calif., USA) and the catalyst is sold by Sigma-Aldrich (St. Louis, Mo. USA). The chemical name of the catalyst is (1,3-Bis(2,4,6-trimethylphenyl)-2-imidazolidinylidene) dichloro(phenylmethylene)(tricyclohexylphosphine)ruthenium.

Example 3

The polymer of Example 1 was compounded and cured in a golf ball core formulation. The formulation contained 100 parts per hundred rubber (phr) of polymer, 23 phr zinc diacrylate, 20 phr zinc oxide, 0.2 phr antioxidant (Ciba Irganox 1076), and 0.5 phr peroxide (t-butylperoxydiisopropyl-benzene; Vulcup R from Geo Specialty Chemicals). All ingredients except the peroxide were mixed in a 300 gram batch in a Brabender Plasticorder internal mixer at a mixing speed of 60 rpm for 5 minutes. The initial temperature was 75° C. and the final temperature of the batch was 105° C. The peroxide was subsequently added to the compound using a two-roll mill at 60° C. Spherical cores with diameters equal to 1.54 inches (39.1 mm) were formed from the final mixture by curing in molds for 20 minutes at 160° C. The coefficient of restitution (COR) was determined for the cores using an air cannon. In this test, the cores have an initial velocity of approximately 143 feet per second (45.6 m/s) before impacting a steel plate. A compression value of 34 and a COR of 0.68 were measured for this example.

Example 4

The polymer of Example 2 was compounded and cured in a golf ball core formulation. The formulation contained 100 parts per hundred rubber (phr) of polymer, 23 phr zinc diacrylate, 20 phr zinc oxide, 0.2 phr antioxidant (Ciba Irganox 1076), and 0.5 phr peroxide (t-butylperoxydiisopropyl-benzene; Vulcup R from Geo Specialty Chemicals). All ingredients except the peroxide were mixed in a 300 gram batch in a Brabender Plasticorder internal mixer at a mixing speed of 60 rpm for 5 minutes. The initial temperature was 75° C. and the final temperature of the batch was 105° C. The peroxide was subsequently added to the compound using a two-roll mill at 60° C. Spherical cores with diameters equal to 1/54 inches (39.1 mm) were formed from the final mixture by curing in molds for 20 minutes at 160° C. The coefficient of restitution (COR) was determined for the cores using an air cannon. In this test, the cores have an initial velocity of approximately 143 feet per second (45.6 m/s) before impacting a steel plate. A compression value of 32 and a COR of 0.69 were measured for this example.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

We claim:

1. An elastomeric interpolymer comprising at least two cyclic olefin monomers, wherein the interpolymer is prepared by a ring opening metathesis polymerization of the at least two cyclic olefin monomers selected from the group consisting of cyclopentene, cyclooctene, 1,3-cyclooctadiene, 1,5-cyclooctadiene, 1,3-cycloheptadiene, and 1,5,9-cyclododecatriene, and wherein the interpolymer is characterized by having no crystallinity, a glass transition temperature ($T_g$) of less than −80° C., and a number average molecular weight ($M_n$) of at least 40 kg/mole, each of the properties determined by the test procedures described herein.

2. The elastomeric interpolymer of claim 1 having at least one functional group.

3. The elastomeric interpolymer of claim 2, wherein the at least one functional group is selected from the group consisting of a carboxylic acid, a nitrile, an amine, an amide, an ester, a sulfonate, a metal salt of a carboxylic acid, succinic anhydride, a hydroxyl, and combinations thereof.

4. The elastomeric interpolymer of claim 1 wherein the glass transition temperature ($T_g$) ranges from less than −80° C. to about −130° C.

5. The elastomeric interpolymer of claim 1 wherein the number average molecular weight ($M_n$) ranges from at least 40 kg/mole to 500 kg/mole.

6. The elastomeric interpolymer of claim 1 wherein the elastomeric interpolymer has no crystallinity, has a glass transition temperature ($T_g$) ranging from less than −80° C. to −130° C., and has a number average molecular weight ($M_n$) ranging from at least 40 kg/mole to 500 kg/mole.

7. The elastomeric interpolymer of claim 1 wherein the number average molecular weight ($M_n$) ranges from about 60 kg/mole to about 200 kg/mole.

8. A method for preparing the elastomeric interpolymer of claim 1 comprising ring opening metathesis polymerizing at least two cyclic olefin monomers, in the presence of a ring opening metathesis polymerization catalyst, and terminating the polymerization, wherein at least one of the cyclic olefin monomers is present in an amount of about 15 to about 85 mole % and the other cyclic olefin monomer(s) are present in the remaining amount of about 85 to about 15 mole %.

9. The elastomeric interpolymer of claim 1, wherein said metathesis polymerization is effected with a Grubbs catalyst.

10. The elastomeric interpolymer of claim 1, wherein said metathesis polymerization is effected with a ruthenium-based or osmium-based ROMP catalyst.

11. The elastomeric interpolymer of claim 1, wherein the ring opening metathesis polymerization of the at least two cyclic olefin monomers takes place by first forming a mixture of the olefin monomers followed by introduction of a catalyst to the mixture.

12. A rubber composition comprising an elastomeric compound comprising at least two cyclic olefin monomers, wherein the interpolymer is prepared by a ring opening metathesis polymerization of the at least two cyclic olefin monomers selected from the group consisting of cyclopentene, cyclooctene, 1,3-cyclooctadiene, 1,5-cyclooctadiene, 1,3-cycloheptadiene, and 1,5,9-cyclododecatriene, and wherein the interpolymer is characterized by having a crystallinity of 0 to about 30%, a glass transition temperature ($T_g$) of less than −80° C., and a number average molecular weight ($M_n$) of at least 40 kg/mole, each of the properties determined by the test procedures described herein.

13. The rubber composition of claim 12 wherein the elastomeric interpolymer has a crystallinity of 0%, a glass transition temperature (Tg) ranging from less than −80° C. to about −130° C., and has a number average molecular weight ($M_n$) ranging from at least 40 kg/mole to 500/kg/mole.

14. The rubber composition of claim 12 wherein the interpolymer has a crystallinity of 0 to about 20%.

15. The rubber composition of claim 12 wherein the interpolymer has a crystallinity of 0%.

16. The rubber composition of claim 12 that is a component of a tire.

17. The rubber composition of claim 12, wherein said metathesis polymerization is effected with a Grubbs catalyst.

18. The rubber composition of claim 12, wherein said metathesis polymerization is effected with a ruthenium-based or osmium-based ROMP catalyst.

19. An interpolymer comprising:
the metathesis polymerization product of at least two distinct cyclic olefin monomers, where the at least two distinct cyclic olefin monomers are selected from the group consisting of cyclopentene, cyclooctene, 1,3-cyclooctadiene, 1,5-cyclooctadiene, 1,3-cycloheptadiene, and 1,5,9-cyclododecatriene, where the interpolymer is characterized by having no crystallinity, a glass transition temperature ($T_g$) of less than −80° C., and a number average molecular weight ($M_n$) of at least 40 kg/mole, and where the interpolymer includes at least one functional group selected from the group consisting of carboxylic acid, a nitrile, an amine, an amide, an ester, a sulfonate, a metal salt of a carboxylic acid, succinic anhydride, a hydroxyl, and combinations thereof.

20. A golf ball core comprising the interpolymer of claim 19.

21. An interpolymer comprising:
the metathesis polymerization product of at least two distinct cyclic olefin monomers, where the interpolymer is characterized by having no crystallinity, a glass transition temperature ($T_g$) of less than −80° C., and a number average molecular weight ($M_n$) of at least 40 kg/mole, and where the interpolymer includes at least one functional group selected from the group consisting of a nitrile, an amine, an amide, an ester, a sulfonate, a metal salt of a carboxylic acid, succinic anhydride, a hydroxyl, and combinations thereof.

* * * * *